3,512,917
VAT DYESTUFF PREPARATIONS OF IMPROVED
VATTING PROPERTIES
Konrad Mix and Eberhard Hebestreit, Frankfurt am Main-Fechenheim, and Peter Klinke, Oberursel, Taunus, Germany, assignors to Cassella Farbwerke Mainkur Aktiengesellschaft, Frankfurt am Main-Fechenheim, Germany, a corporation of Germany
No Drawing. Filed Sept. 26, 1966, Ser. No. 581,699
Claims priority, application Germany, Sept. 28, 1965, C 36,989
Int. Cl. C09b 9/00; D06p 1/22
U.S. Cl. 8—34                                  10 Claims

ABSTRACT OF THE DISCLOSURE

Dyestuff preparations containing a vat dye, sodium dithionite as reducing agent and, as an assistant, aminoanthraquinone sulfonic acid, aminoanthraquinone sulfonamide, aminoanthraquinone sulfonic acid ester or a salt of aminoanthraquinone sulfonic acid and their use in the dyeing of cellulosic materials.

---

The present invention relates to dyestuff preparations containing a new type of dye and printing assistant and products dyed and printed therefrom.

Quite a number of processes are already known that allow an improvement of the vatting property of vat dyestuff preparations. However, the majority of these processes can be employed only for the printing with vat dyestuffs, whereas they do not produce any improvement in the dyeing.

British Pats. 349,955 and 378,553 teach that hydroxyanthraquinones as reducing catalysts improve the vatting property of vat and sulfur dyestuffs in printing. U.S. Pat. 2,371,102 recommends for the dyeing and printing the employment of N,N'-dianthraquinonyl fumaric acid diamides as assistants in order to improve the vatting properties. British Pat. 975,967 teaches the utilization of cobalt (II) salts of the 2-hydroxy- and 2,6-dihydroxyanthraquinone as a vatting accelerator. Moreover, it is known from U.S. Pats. 2,371,101 and 2,405,151 to use for said purpose arylamine salts of anthraquinone mono- and disulfonic acids as well as anthraquinonyl sulfonamides.

However, all the vatting accelerators as mentioned above show, particularly in dyeing, only slight effects so that their employment is of no noteworthy significance in practice.

Modern dyeing methods, however, require a very rapid vatting of the vat dyestuffs employed. In order to meet these requirements, suitable dyestuff preparations had to be made, so far, partly with a great expenditure that lies, for example, in wearisome and lengthy grinding operations on high quality grinding aggregates or in troublesome reprecipitation measures. Moreover, quite a number of valuable vat dyestuffs cannot be brought into an appropriate form and, therefore, cannot be employed for said purpose at all.

We, now have found that the vatting property of vat dyestuffs can be improved to an extent that is far superior to prior art by vatting the dyestuffs after the addition of small amounts of aminoanthraquinone sulfonic acids or functional derivatives thereof, which may contain further substituents. Generally, an addition of 0.001 to 5% by weight, preferably 0.01 to 2% by weight, of the auxiliary agent under this invention, related to the weight of the dyestuff employed, is sufficient.

Aminoanthraquinone sulphonic acids and derivatives thereof, which may contain further substituents, suited for the process under this invention are, for example, mono- and disulfonic acids of mono- and polyaminoanthraquinones, 1 - amino - 4-bromanthraquinone-2-sulfonic acid and its arylamino derivatives, aminohydroxyanthraquinone sulfonic acids, alkali salts of the aminoanthraquinone sulfonic acids, organic amino salts of the aminoanthraquinone sulfonic acids, aminoanthraquinone sulfonamides deriving from primary and secondary aliphatic and aromatic amines, aminoanthraquinone sulfonic acid esters and the like. The 1-amino-anthraquinone-2-, -4- or -5-sulfonic acids or their derivatives and substitution products have proved to have a particularly valuable effect.

The effectiveness of aminoanthraquinone sulfonic acids containing the amino group and the sulfo group in the same nucleus, is not increased by the introduction of a further sulfonic acid group but is enhanced by the introduction of a further hydroxyl or arylamino group or a halogen atom into the same nucleus or of an amino group into the non-substituted nucleus as is evident, for example, from the case of the 1,5-diaminoanthraquinone-2-sulfonic acid.

The aminoanthraquinone sulfonic acids and the like may be added either to the dye liquor or the printing paste; however, the auxiliary agents utilizable under the present invention may previously be incorporated into the dye formulations used for the preparation of the dye liquors or printing pastes. The vatting accelerators under this invention are particularly valuable in that they produce their excellent effect in the dyeing and printing operations as well.

The dye compositions according to the present invention are suited for dyeing and printing any sort of cellulosic materials such as cotton, rayon, staple fiber, mixed cellulosic fabrics and the like by the methods hitherto known in the art.

The following examples are given for the purpose of illustrating the present invention. Unless otherwise stated, all temperatures given are in degrees centigrade.

EXAMPLE 1

Comparative dyeing tests directed to examine the vatting acceleration effected by various anthraquinone derivatives in a long vatting bath:

Each time 2 dye liquors are prepared with 2% Indanthren®-Brilliant Pink RS (Colour Index No. 73360) together with 10 cc. per liter sodium hydroxide solution of 38° Bé. and 4 g. per liter sodium dithionite, whereby one of the dye liquors is admixed with 0.01 g. per liter of the vatting accelerator.

After the introduction of cotton yarn into the bath (liquor ratio 1:20), at 20°, the temperature of the liquor is raised to 50° within 5 minutes and kept at this temperature for 10 minutes. The dyeings are subsequently oxidized, rinsed, and soaped in the usual manner.

The comparison of the color yields between the dyeings obtained with a vatting accelerator and those obtained without said accelerator is evaluated as follows:

— equal coloring strength in both cases
+ slight improvement in the case where the vatting accelerator is added
++ good improvement in the case where the vatting accelerator is added
+++ very good improvement in the case where the vatting accelerator is added
++++ superior improvement in the case where the vatting accelerator is added.

The following table enumerates the anthraquinone derivatives examined:

| | |
|---|---|
| 1-aminoanthraquinone-2-sulfonic acid | +++ |
| 1-aminoanthraquinone-4-sulfonic acid | +++ |
| 1-aminoanthraquinone-5-sulfonic acid | +++ |
| 1-aminoanthraquinone-6-sulfonic acid | ++ |
| 1-aminoanthraquinone-7-sulfonic acid | ++ |
| 2-aminoanthraquinone-6-sulfonic acid | ++ |
| 2-aminoanthraquinone-7-sulfonic acid | ++ |
| 1-aminoanthraquinone-2,5-disulfonic acid | ++ |
| 1-aminoanthraquinone-2,7-disulfonic acid | ++ |
| 1-aminoanthraquinone-4,6-disulfonic acid | ++ |
| 2-aminoanthraquinone-3,6-disulfonic acid | ++ |
| 2-aminoanthraquinone-3,7-disulfonic acid | ++ |
| 1,5-diaminoanthraquinone-2-sulfonic acid | ++++ |
| 1-amino-4-bromoanthraquinone-2-sulfonic acid | +++ |
| 1-amino-4-hydroxyanthraquinone-2-sulfonic acid | +++ |
| 1-amino-4(3'-cyano-phenylamino)-anthraquinone-2-sulfonic acid | +++ |
| 1,5-diamino-4,8-dihydroxyanthraquinone-3,7-disulfonic acid | ++ |
| 1-aminoanthraquinone-2-sulfonic acid-β-hydroxy-ethylamide | +++ |
| 1-aminoanthraquinone-2-sulfonic acid-amide | +++ |
| 1-aminoanthraquinone-2-sulfonic acid-methylamide | ++ |
| 1-aminoanthraquinone-2-sulfonic acid-diethylamide | ++ |
| 1-aminoanthraquinone-2-sulfonic acid-phenylamide | +++ |
| 1-aminoanthraquinone-2-sulfonic acid-N-methyl-N-phenylamide | ++ |
| N,N'-di-α-anthraquinonyl-fumaric acid diamide [1] | — |
| N,N'-di-β-anthraquinonyl-fumaric acid diamide [1] | — |
| Cobalt (II) complex of the anthraflavinic acid [2] | + |
| Cobalt (II) complex of the 2-hydroxyanthraquinone [2] | + |
| Anthraflavinic acid (according to British Patents 349,955 and 378,553) | + |

[1] According to U.S. Patent 2,371,102.
[2] According to British Patent 975,967.

EXAMPLE 2

Examination of the vatting acceleration of various vat dyestuffs by means of 1-aminoanthraquinone-2-sulfonic acid (A) or 1,5-diaminoanthraquinone-2-sulfonic acid (B):

| Dyestuff | Color Index No. | Vatting | Vatting accelerator in percent by weight related to the weight of the dyestuff | Percentage decrease in vatting time |
|---|---|---|---|---|
| Indanthren®-Scarlet GK | 59310 | Long bath at 50° | 1% B | 43 |
| Indanthren®-Yellow F2 GC. | | Concentrated vatting at 50°. | 1% B | 50 |
| Do | 59310 | do | 1% A | 15 |
| Indanthren®-Ruby RS | 70320 | Long bath at 60° | 1% A | 45 |
| Do | 73020 | do | 1% B | 70 |
| Indanthren®-Orange 4R | 59710 | Concentrated vatting at 50°. | 1% B | 32 |
| Indanthren®-Blue RS | 69800 | Long bath at 60° | 1% A | 43 |
| Do | 69800 | do | 1% B | 71 |
| Indanthren®-Brilliant Pink RS. | 73360 | Concentrated vatting at 75°. | 5% A | 58 |
| Do | 73360 | do | 1% A | 50 |
| Do | 73360 | do | 0.5% A | 46 |
| Do | 73360 | do | 0.1% A | 37 |
| Do | 73360 | do | 1% B | 75 |
| Do | 73360 | do | 0.5% B | 71 |
| Do | 73360 | do | 0.1% B | 70 |
| Do | 73360 | Long bath at 75° | 0.1% B | 72 |
| Do | 73360 | do | 0.01% B | 38 |
| | | | | Vatting time in minutes: |
| Do | 73360 | Long bath at 50° | No addition | Not vattable. |
| Do | 73360 | do | 0.001% B | 48 |
| Do | 73360 | do | 0.01% B | 22 |
| Do | 73360 | do | 0.1% B | 12 |

[1] C.I. vat yellow.

Vatting was effected in the manner as is customary for Indanthren®-dyestuffs. As regards the concentrated vatting, operation was done according to the directions of the Indanthren dyeing manual. Vatting in the long bath was run with 1 g./l. of the dyestuff each time.

The vatting procedure was followed with the aid of a spectrophotometer by measuring the transparency of the vat increasing commensurately with the progressive vatting. The percentage decrease in the time necessary to effect vatting was determined from the relation to a blank test, i.e., a vat to which no vatting accelerator is added.

It will be understood that this invention is susceptible to further modification and, accordingly, it is desired to comprehend such modification within this invention as may fall within the scope of the appended claims.

We claim:
1. A dye composition comprising a vat dye, sodium dithionite as the reducing agent and, as an assistant, an aminoanthraquinone sulfonic acid, an aminoanthraquinone sulfonamide, an aminoanthraquinone sulfonic acid ester or a salt of an aminoanthraquinone sulfonic acid, said composition containing 0.001 to 5% by weight of said assistant based on the weight of said vat dye.

2. The dye composition of claim 1 containing 0.01 to 2% by weight of said assistant based on the weight of said vat dye.

3. The dye composition of claim 1 wherein said assistant is 1-aminoanthraquinone sulfonic acid.

4. The dye composition of claim 1 wherein said assistant is 2-aminoanthraquinone sulfonic acid.

5. The dye composition of claim 1 wherein said assistant is 4-aminoanthraquinone sulfonic acid.

6. The dye composition of claim 1 wherein said assistant is 5-aminoanthraquinone sulfonic acid.

7. The dye composition of claim 1 wherein said assistant is 1-aminoanthraquinone-2-sulfonamide.

8. A dye liquor containing a dye composition of claim 1.

9. A printing paste containing a dye composition of claim 1.

10. An article of manufacture comprising a cellulosic fabric dyed or printed with a dye composition of claim 1.

References Cited

UNITED STATES PATENTS

| 3,118,724 | 1/1964 | Goerrig et al. | 8—34 |
| 3,273,955 | 9/1966 | Goerrig et al. | 8—34 |

FOREIGN PATENTS

| 787,343 | 12/1957 | Great Britain. |

NORMAN G. TORCHIN, Primary Examiner

J. E. CALLAGHAN, Assistant Examiner